Aug. 2, 1927.
R. B. FAGEOL
1,637,770
FENDER GUARD
Filed Feb. 18, 1925
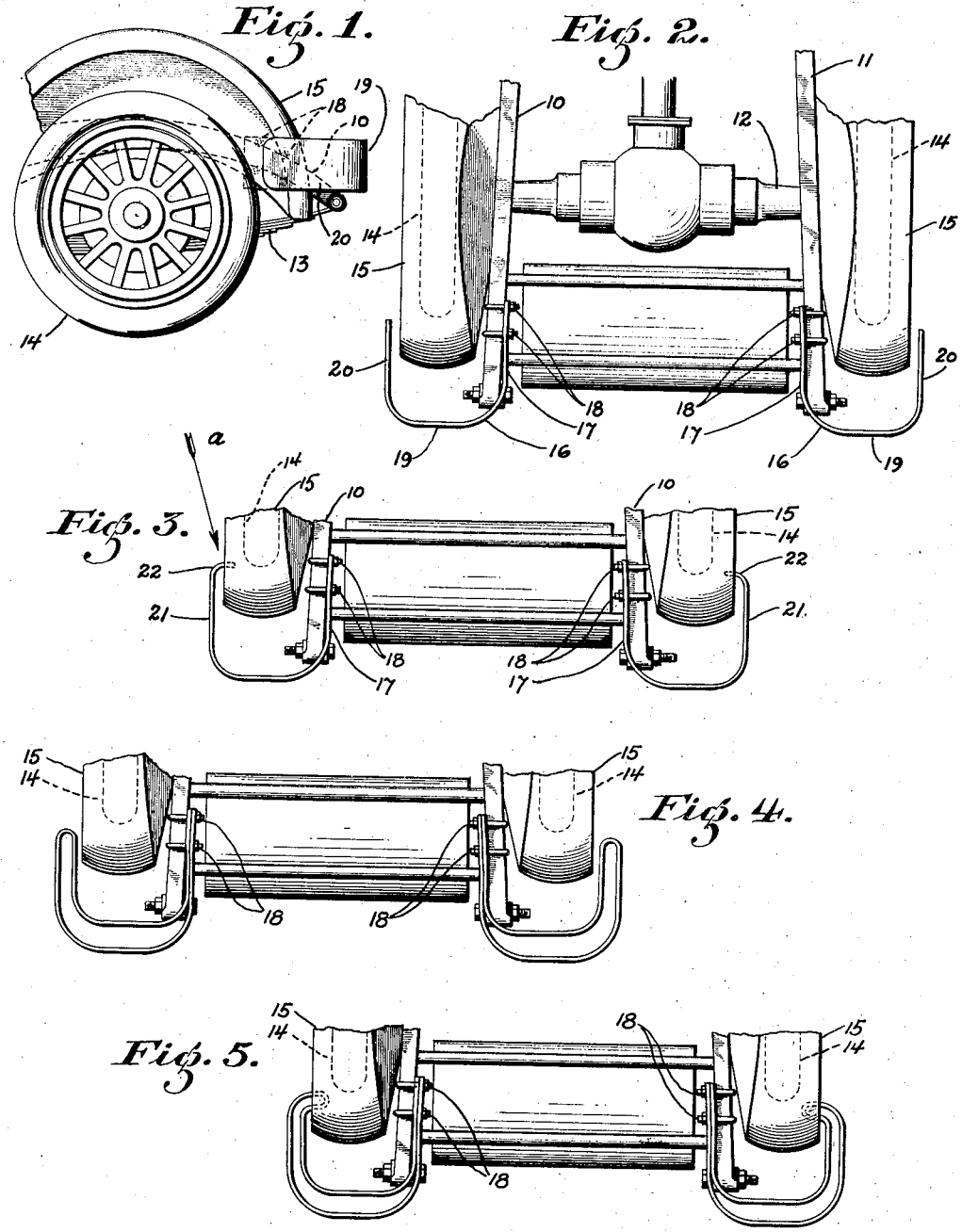
INVENTOR.
Rollie B. Fageol.
BY
ATTORNEYS.

Patented Aug. 2, 1927.

1,637,770

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

FENDER GUARD.

Application filed February 18, 1925. Serial No. 9,980.

This invention relates to fender guards for automobiles and particularly pertains to means for guarding and protecting the wheel fenders of an automobile.

In the use of automobiles, it has been found desirable to provide means such as bumpers for protecting the forward and rear ends of the vehicle in the event that it collides with another object. Due to the fact that it is now common practice to mount either a trunk rack or a tire carrier at the rear of the vehicle frame, it is desirable to provide some means for accommodating these accessories and at the same time to afford adequate protection for the fenders of the vehicle in the case of collision.

It is the principal object of the present invention, therefore, to provide a pair of bumper tips which will project from the rear of the automobile frame and overhang the rear fenders in a manner to protect them from collision either from the rear, sides, or obliquely from the front, said bumper tips being especially designed in a manner to insure that they may be easily mounted upon the vehicle main frame and rigidly secured in position.

The present invention contemplates the use of a pair of bumper tips or horns separately secured to the side frame members of the vehicle and extending outwardly therefrom, and thereafter extending forwardly along the outer sides of the vehicle rear fenders in a manner to interpose a guard between said fenders and an object with which it might collide.

The present invention is illustrated by way of example in the accompanying drawings, in which:

Fig. 1 is a fragmentary view in side elevation of the rear end of an automobile showing one of its rear wheels, a fender therefor, and a fender guard carried by one of the side frame members of the vehicle.

Fig. 2 is a fragmentary view in plan showing a simple form of the invention as applied to the rear end of an automobile frame.

Fig. 3 is another form of the invention as shown in Fig. 1 with additional protecting means for the fenders.

Fig. 4 is a fragmentary view in plan showing the rear end of an automobile frame with a pair of bumpers embodying the present invention mounted thereon, said bumpers being of the loop type.

Fig. 5 is a fragmentary view in plan similar to Fig. 4 showing the same general type of fender guard formed with a hook on the terminating end of its loop.

Referring more particularly to the drawings, 10 and 11 indicate the side members of an automobile main frame which are supported upon an automobile rear axle 12 by springs 13. Carried at the opposite ends of the axle are wheels 14 which are fitted with mud guards or fenders 15. These fenders may be of any preferred design, and as is customary, they will extend over and rearwardly of the wheel.

It very often occurs that in traffic the fenders of automobiles are crushed in collision, and that the usual form of bumpers extending across the rear of the vehicle and overhanging the fenders do not afford adequate protection to the fenders. With this idea in view, the fender guards 16 have been provided.

The simple form of guard shown in Fig. 2 comprises a mounting arm 17 which may be secured to the side of one of the frame members 10 and 11 by U-bolts or hook bolts generally indicated at 18. The continuations of the brackets are outwardly curved to form horizontally extending impact sections 19. These sections terminate in fender guard extensions 20, which are substantially parallel to the brackets 17 and form a U-shaped fender guard, one leg of which is fastened to the frame and the other leg of which extends along the outer side of the fender 14.

Attention is called to the fact that in the present instance the stock from which the fender guards are made is of a width considerably in excess of the width of ordinary bumper tips or bumpers, this stock having been selected for its vertical rigidity and also so that its dimensions will permit the fender guards to be universally adapted to the frame horns of various designs of automobiles without a variation in design for the different makes of cars, it being understood that at the present time the variations in frame horns make it necessary for narrow stock fenders to be shaped so that they may be securely fitted and fastened to the different makes of frames. By the use, however, of the wide stock material, as clearly indicated in Fig. 1, it is possible to easily apply fender guards of this type to a number of makes of automobiles.

In the form of the invention shown in Fig. 3, the outer extension of the fender guard generally indicated at 21, is formed with an inwardly curved hooked portion 22 which occurs at the outer terminal of the bar or plate from which the guard is made. This formation insures that collision with an object striking obliquely from in front, as in the direction of the arrow —a— as indicated in Fig. 3, will prevent the curled edge of the fender 15 from being caught and will ward off the blow.

In the forms of the invention shown in Figs. 4 and 5, the same general design of fender is followed as previously described in Figs. 2 and 3, with the exception that the fenders are of the loop type.

In the form of the invention shown in Fig. 4, which agrees in design with that previously described in Fig. 2, the bar from which the fender guard is made is bent upon itself to form a loop extending alongside of the fender and substantially parallel to the side rear of the main frame. The continuations of this loop portion extend substantially at right angles thereto and are then curved so that their terminal portions lie parallel to each other and may be bolted or otherwise fastened against the side face of the vehicle frame.

In the form of invention shown in Fig. 5, which agrees with the design previously disclosed in Fig. 3, the loop is carried forwardly and turned inwardly so that the end of the loop hooks around and in front of the curl on the fender guard.

While I have shown the preferred form of my invention as now known to me, I wish it understood that various changes may be made in its construction without departing from the spirit of the invention as defined in the appended claims.

Having thus described my invention, what I claim and desire to secure by Letters Patent is:

1. In combination with an automobile frame and wheel fenders carried thereby, a fender guard of U-shaped design, one leg of which is adapted to be fastened to the side bar of the automobile main frame, and the other leg of which extends along the outer face of the fender, said last named leg terminating in an inturned hook extending around the outer marginal flange of a fender.

2. In combination with an automobile main frame and the wheel fenders carried thereby, a fender guard comprising an impact section extending horizontally and being positioned transversely and in the rear of a fender, means formed at one end thereof for securing said impact member to the frame of the vehicle in the aforesaid position, means formed on the opposite end thereof for extending alongside the outer face of the fender to guard the same, and means formed at the end of said last named section for hooking around the outer marginal flange of the fender.

3. In combination with an automobile frame, a wheel fender carried thereby, a fender guard of U-shaped design, one leg of which is adapted to be fastened to the side bar of an automobile main frame and the other leg of which is adapted to extend forwardly along the outer face of the fender and terminate in a free end at a point in advance of the outer marginal edge of the wheel fender for the protection of the same.

ROLLIE B. FAGEOL.